US 6,768,826 B2

(12) United States Patent
Ayadi

(10) Patent No.: US 6,768,826 B2
(45) Date of Patent: Jul. 27, 2004

(54) DELIVERING DATA OPTICALLY TO AN INTEGRATED CIRCUIT

(75) Inventor: Kamel Ayadi, Puchheim (TN)

(73) Assignee: Infineon Technologies AG, Munich ( * ) Notice: Subject to any disclaimer, the term of this patent is extended or adjusted under 35 U.S.C. 154(b) by 163 days.

(21) Appl. No.: 09/918,353

(22) Filed: Jul. 30, 2001

(65) Prior Publication Data

US 2003/0021517 A1 Jan. 30, 2003

(51) Int. Cl.[7] .............................................. G02B 6/12
(52) U.S. Cl. ....................................................... 385/14
(58) Field of Search ................................ 385/14, 9–13

(56) References Cited

U.S. PATENT DOCUMENTS

| | | | | |
|---|---|---|---|---|
| 5,521,992 A | * | 5/1996 | Chun et al. ................... 385/14 |
| 5,986,590 A | * | 11/1999 | Smith et al. ................... 341/70 |
| 6,450,704 B1 | * | 9/2002 | O'Connor et al. ............ 385/92 |
| 6,576,888 B2 | * | 6/2003 | Fujimura et al. ...... 250/227.11 |

OTHER PUBLICATIONS

T.K. Woodward and A.V. Krishnamoorthy, "1–GB/s Integrated Optical Detectors and Receivers in commercial CMOS Technologies," IEEE J. Selected Topics in Quantum Electrons, vol. 5, No. 1, pp. 146–156, Mar. 1999.

K. Ayadi, "High–Speed, Highly–Sensitive OEIC Using Clocked Vertical BJTs PhotoDarlington in CMOS Technology," IEEE J. Solid–State Circuits, vol. 34, No. 4, pp. 559–564, Apr. 1999.

K.P. Jackson. E. B. Flint, M.F. Cina, D. Lacey, Y. Kwark, J.M. Trewhella, T. Caulfield, P. Buchmann, Ch. Harder and P. Vettiger, "A High–Density, Four–Channel, OEIC Transceiver Module Utilizing Planar–Processed Optical Waveguides and Flip–Chip, Solder–Bump Technology," IEEE J. Lightwave Techno., vol. 12, No. 7, pp. 1185–1191, 1994.

H. Kosaka, M. Kajita, M. Yamada, and Y, Sugimoto, "A 16×16 Optical Full–Cross–Bar Connection with VCSEL—Array Push/Pull Module and Polymer–Waveguide Coupler Connector," IEEE Photon. Technol. Lett., vol. 9, No. 2, pp. 244–246, Feb. 1997.

C.Y. Chang, and S.M. Sze, "ULSI Technology," Singapore, McGraw–Hill, 1996, chapter 10.

(List continued on next page.)

Primary Examiner—Khiem Nguyen
(74) Attorney, Agent, or Firm—Fish & Richardson P.C.

(57) ABSTRACT

A system includes a multi-sided module having a cavity housing a substrate and n photoreceivers located on a side of the substrate and adapted to receive a beam of collimated light directed by a waveguide. The system also includes an integrated circuit (IC) positioned at the substrate to receive output from the photoreceiver.

39 Claims, 10 Drawing Sheets

OTHER PUBLICATIONS

J.W. Goodman, F.J. Leonberger, S.-Y. Kung, and R.A. Athale, "Optical Interconnections for VLSI Systems," Proceedings of the IEEE, vol. 72, No. 7, Jul. 1984.

F.A.P. Tooley, "Optically Interconnected Electronics–Challenges and Choices," Proceedings "Massively Parallel Processing Using Optical Interconnections" MPPOI'96, pp. 138–145, 1996. See also F.A.P. Tooley, "Challenges in Optically Interconnecting Electronics," IEEE J. Select. Areas Quantum Electron., vol. 2, pp. 3–13, Apr. 1996.

M. Kihara, S. Nagasawa, M. Takaya, and T. Tanifuji, "A New type of Demountable Optical Device for Coupling Single–Mode Planar Waveguides to a Multifiber Array Using Passive Alignment," IEEE Photo. Technol. Lett., vol. 7, No. 11, pp. 1453–1455, 1995.

T. Satake, T. Arikawa, P.W. Blubaugh, C. Persons, and T. Uchida, "MT multifiber connectors and new applications," in Proc. Electron. Components Technol. Conf. (ECTC), pp. 994–999, 1994.

R. Nagarjan, W. Sha, B. Li, and R. Craig, "Gigabyte/s Parallel Fiber–Optic Links Based on Edge Emitting Laser Diode Arrays," IEEE J. Lightwave Techno., vol. 16, No. 5, pp. 778–787, May 1998.

Y. Yamada, F. Hanawa, T. Kitoh, and T. Maruno, "Low–Loss and Stable Fiber–to–Waveguide Connection Utilizing UV Curable Adhesive," IEEE Photon. Technol. Lett., vol. 4, No. 8, pp. 906–908, Aug. 1992.

J.M. Senior, "Optical Fiber Communications: Principles and Practice," Prentice Hall, 1992.

M. Kajita, H. Kosaka, M. Yamada, Y. Sugimoto, K. Kurata, and T. Tanabe, "1–Gb/s Modulation Characteristics of a Vertical–Cavity Surface–Emitting Laser Array Module," IEEE Photon. Technol. Lett., vol. 9, No. 2, pp. 146–148, Feb. 1997.

Y. Ota, R.C. Miller, S.R. Forrest, D.R. Kaplan, C.W. Seabury, R.B. Huntington, J.G. Johnson, and J.R. Potopowicz, "Twelve–Channel Individually Addressable InGaAs/InP p–i–n Photodiode and InGaAsP/InP LED Array in a Compact Package," IEEE J. Lightwave Technology, vol. LT–5, No. 8, pp. 1118–1122, Aug. 1987.

T. Sakake, N. Kashima, and M. Oki, "Very Small Single–Mode Ten–Fiber Connector," IEEE J. Lightwave Technology, vol. 6, No. 2, pp. 269–272, 1988.

G. Nakagawa, K. Miura, K. Tanaka, and M. Yano, "Multichannel Fiber Ferrule for a Stable Laser–Diode Array Module," IEEE Photon. Technol. Lett., vol. 7, No. 4, pp. 409–411, Apr. 1995.

A. Krishnamoorthy, and D.A.B. Miller, "Scaling Optoelectronic—VLSI Circuits into the $21^{st}$ Century: A Technology Roadmap," IEEE J. Selected Topics in Quantum Electronics, vol. 2, No. 1, pp. 55–76, Apr. 1996.

"Estimation of Ground Bounce . . . " by A. Kabbani et al. IEEE Transactions on Components and Packaging Technology, vol. 22, No. 2, pp. 316–325, Jun. 1999.

G.N. Lu, et al., "Color detection using . . . " IEEE Electron Lett., vol. 32, No. 6, pp. 594–596, Mar. 1996.

* cited by examiner

DELIVERING DATA OPTICALLY TO AN INTEGRATED CIRCUIT

TECHNICAL FIELD

This invention relates to delivering data optically to an integrated circuit.

BACKGROUND

In integrated circuit (IC) design there are areas of concern for designers: IC density and size, IC power dissipation, and IC speed. The IC, containing many millions of sub-micron transistors, has become more dense and smaller in size. The power dissipation per square area has increased but it is reduced when the IC is powered with a low voltage. A metal trace provides DC voltages and electronic digital data to an integrated circuit at a maximum data rate at about 500 MHz.

SUMMARY

In general, in one aspect, the invention is directed to a system including a multi-sided module having a cavity housing a substrate, n photoreceivers located on a side of the substrate and adapted to receive a beam of collimated light directed by a waveguide and an integrated circuit (IC) positioned at the substrate to receive output from the photoreceiver.

This aspect may include one or more of the following features. The system has a beam of collimated light that includes a first laser light packet. The laser light packet includes a first set of n laser light pulses. The beam of collimated light comes from a network. The n photoreceivers are connected to a first set of n transistors and include n photodetectors for converting the first set of n laser light pulses to a first set of n electronic pulses and n receivers for converting the first set of n electronic pulses to a first digitized packet. The system also includes a first set of n latches for storing the digitized packet, and a first set of n buffers for amplifying and delivering the first digitized packet from the first set of n latches to the IC. In addition, the system includes a second set of n transistors activated by a clock pulse, the second set of n transistors transferring the first digitized packet to the first set of n latches. The system includes a second set of k latches for storing a second digitized packet sent by the IC, where k≧1, the second digitized packet having a second set of k electronic pulses, and a second set of k buffers for amplifying and delivering the second set of k electronic pulses to a multiplexer.

The system also includes a laser controller for receiving a series of k electronic pulses from the multiplexer and a laser light source receiving an input from the laser controller and sending a second laser packet having a second set of k light pulses to the network. The system may have k=n, where n≧1. The substrate includes a first surface and a second surface opposite to the first surface, the first surface is in contact with the module and the sides of the substrate and the second surface are not in contact with the module. The beam of collimated light is injected horizontally into the substrate. Multiple wavelengths are injected into the substrate at once.

In general, in another aspect, the invention is directed to a method that directs a beam of collimated light through a waveguide positioned at a multi-sided module towards n photoreceivers located at a side of a substrate contained in a cavity of the module; and sends an output of the n photoreceivers to an integrated circuit.

Embodiments of the invention may have one or more of the following advantages. The system provides optical data to an integrated circuit at 1 GHZ and beyond. By having the photodetectors on the sides of the substrate, design improvements can be made at the module at a greater cost savings than the more costly design changes at the substrate that can be an IC chip. The high yield of the IC chip remains intact since the aggressive processes are directed to the module. Since the photodetector is part of the substrate, there is no need for additional layers and masks or other special manufacturing processes.

Lateral injection of laser light to the IC chip is possible which improves the frequency and the dynamic range of the photodetector. In the proposed configuration, the photodetector becomes extremely sensitive to laser light of energy in the aJ (atto Joule) range.

Multi-wavelengths of laser light can be used simultaneously to increase significantly the data transmission rate.

DETAILED DESCRIPTION

Figure 1:
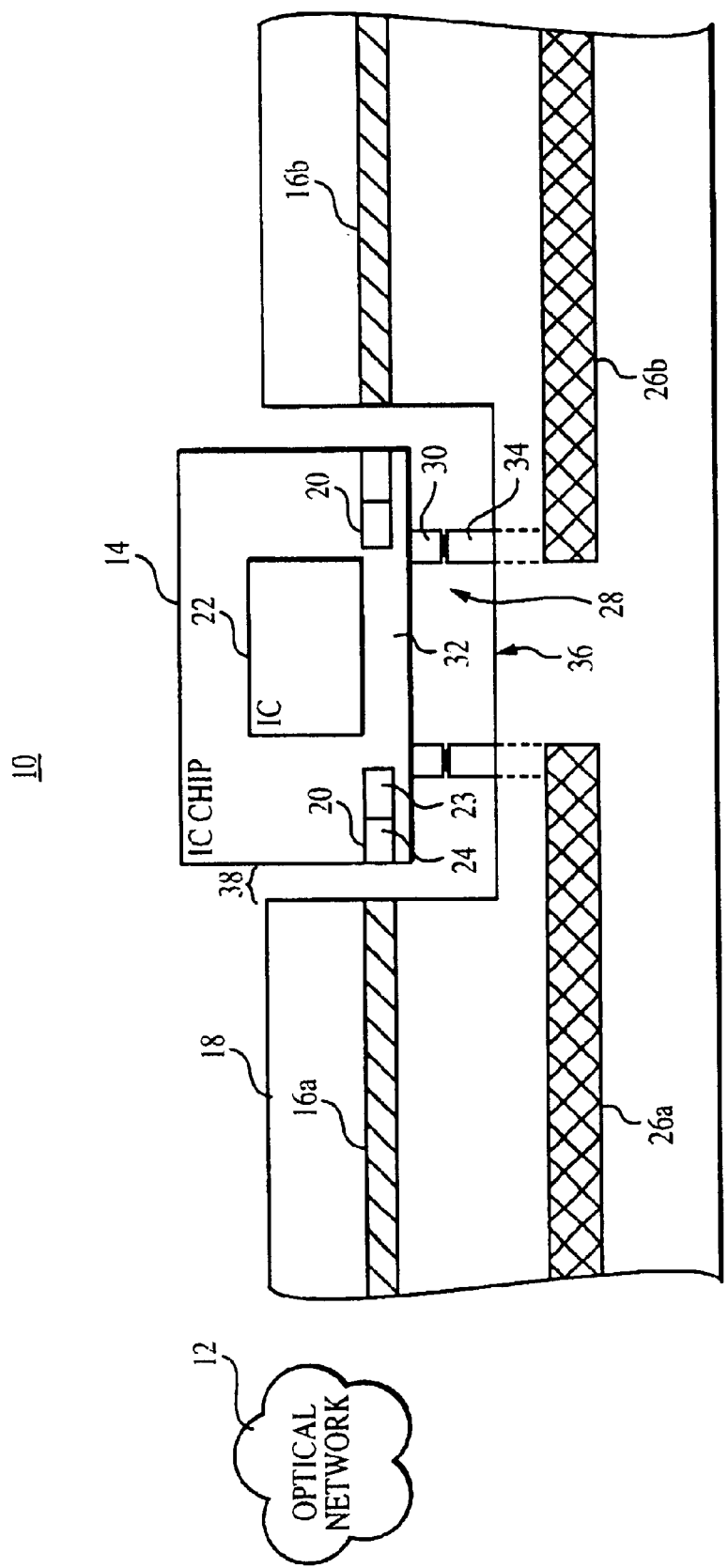
FIG. 1 is a cross-sectional view of an optical delivery system.

Referring to FIG. 1, an optical delivery system 10 receives data in the form of a laser packet from an optical network 12 and delivers the data to an integrated circuit (IC) chip 14 through waveguides 16a–b positioned inside a module 18. IC chip 14 is a substrate that includes an array of n photoreceivers 20 and an IC 22, where n≧1. IC chip 14 can be made of silicon, SiGe, GaAs or other substrate material suitable for IC fabrication. n photoreceivers 20 include n photodetectors 24 and n receivers 23. IC chip 14 receives the laser packet at n photodetectors 24.

By sending information optically, rather than electronically, IC chip 14 may receive data, for example, at 10–100 GHz or an optical data rate of 10 to 100 Gbits/s. If an electronic data delivery system was used to send electronic data through metal traces 26a and 26b instead of waveguides 16a and 16b, high frequency inputs would induce resistor-capacitor (RC) signal delays because of the resistivity of metal traces 26a and 26b. These RC signal delays can cause a bottleneck in the information flow at approximately 500 MHz and above. Thus, the optical delivery system 10 offers a faster rate of data delivery. Metal traces 26a and 26b are used in optical delivery system 10 to supply power to various components in IC chip 14 and drive low frequency signals that are used, e.g., for burn-in chip stress and test.

Figure 2:
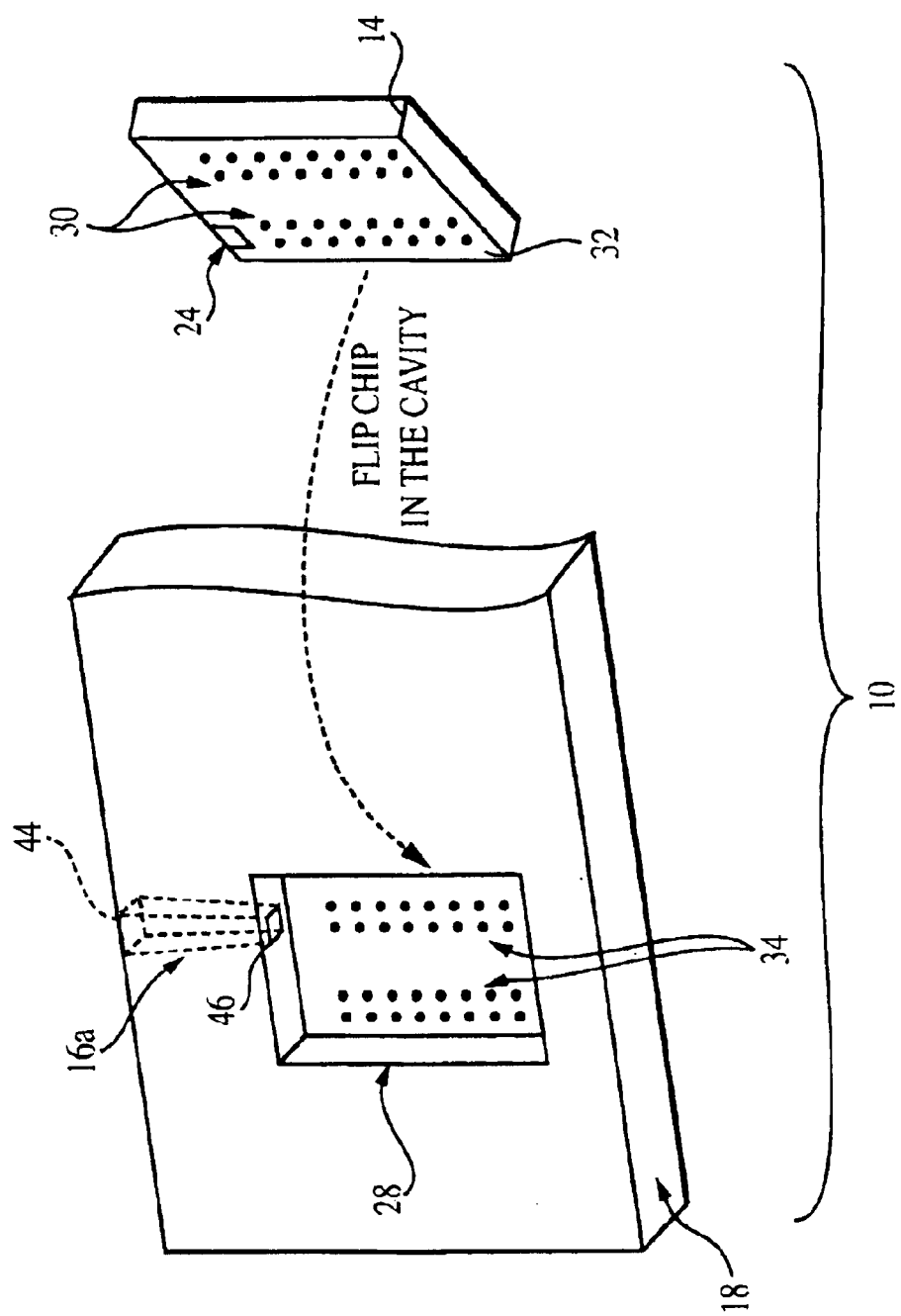
FIG. 2 is top view of the optical delivery system with an integrated circuit chip removed.
Figure 3:
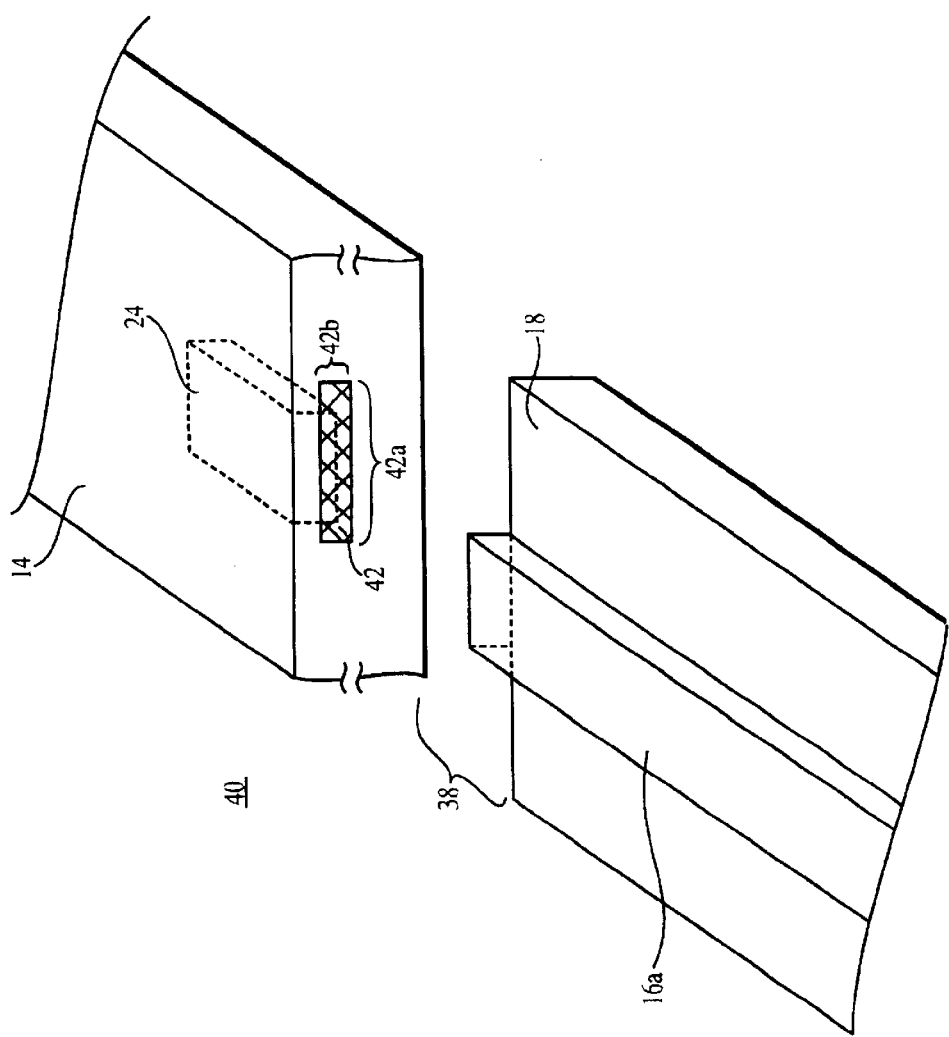
FIG. 3 is a side view of a part of the optical delivery system.

In this example, referring to FIGS. 1–3, IC chip 14 is positioned within a cavity 28 of module 18. A first set of solderballs 30 are positioned at a first surface 32 of IC chip 14 and are connected to a second set of a solderballs 34 located at a bottom portion 36 of cavity 28. Solderballs 30 and 34 serve as interconnections so that the power supplied through metal traces 26a and 26b can power components of IC chip 14.

Packets of laser light, in the form of monochrome laser light, are injected horizontally through the waveguides 16a and 16b and pass through a free space 38 before hitting the n photodetectors 24 at a sidewall 40 of IC chip 14.

When the substrate is silicon and the technology is a complimentary metal-oxide-semiconductor (CMOS tech.), the n photodetectors 24 can be simple photodiodes of one layer n-type and one layer p-type such as N-well/P$^-$ substrate photodiode. Laser light with energy exceeding a forbidden energy gap of n photodetectors 24 is used so that when laser light is injected into IC chip 14, generated photocarriers in a depleted junction 42 will immediately be swept out of depleted junction 42 due to an existing electric field. The horizontal injection of light to n photodetectors 24 has the advantage of defining the affected depth of the substrate by light. This improves the ability of the n photodetectors 24 to function at high frequencies by reducing a vertical diffusion time of the photocarriers in IC chip 14.

System 10 can have many configurations. In a first configuration, single waveguide 16a is facing single photodetector 24 as shown in FIG. 3. Waveguide 16a is fabricated so that waveguide 16a is wider at an exterior sidewall 44 of module 18 than at an interior sidewall 46 of cavity 28 as shown in FIG. 3. For example, at interior sidewall 46, the area is 20×5 square microns, where a width 42a of depleted junction 42 is 20 microns, and depth 42b of depleted junction 42 together with the depth of photodetector 24 is 5 microns. At exterior sidewall 44, the area of 70×70 square microns accommodates the end of an optical fiber core of 50×50 square microns. With this waveguide construction, the horizontally injected laser light will only affect depletion junction 42 and photodetector 24 of IC chip 14.

Figure 4:
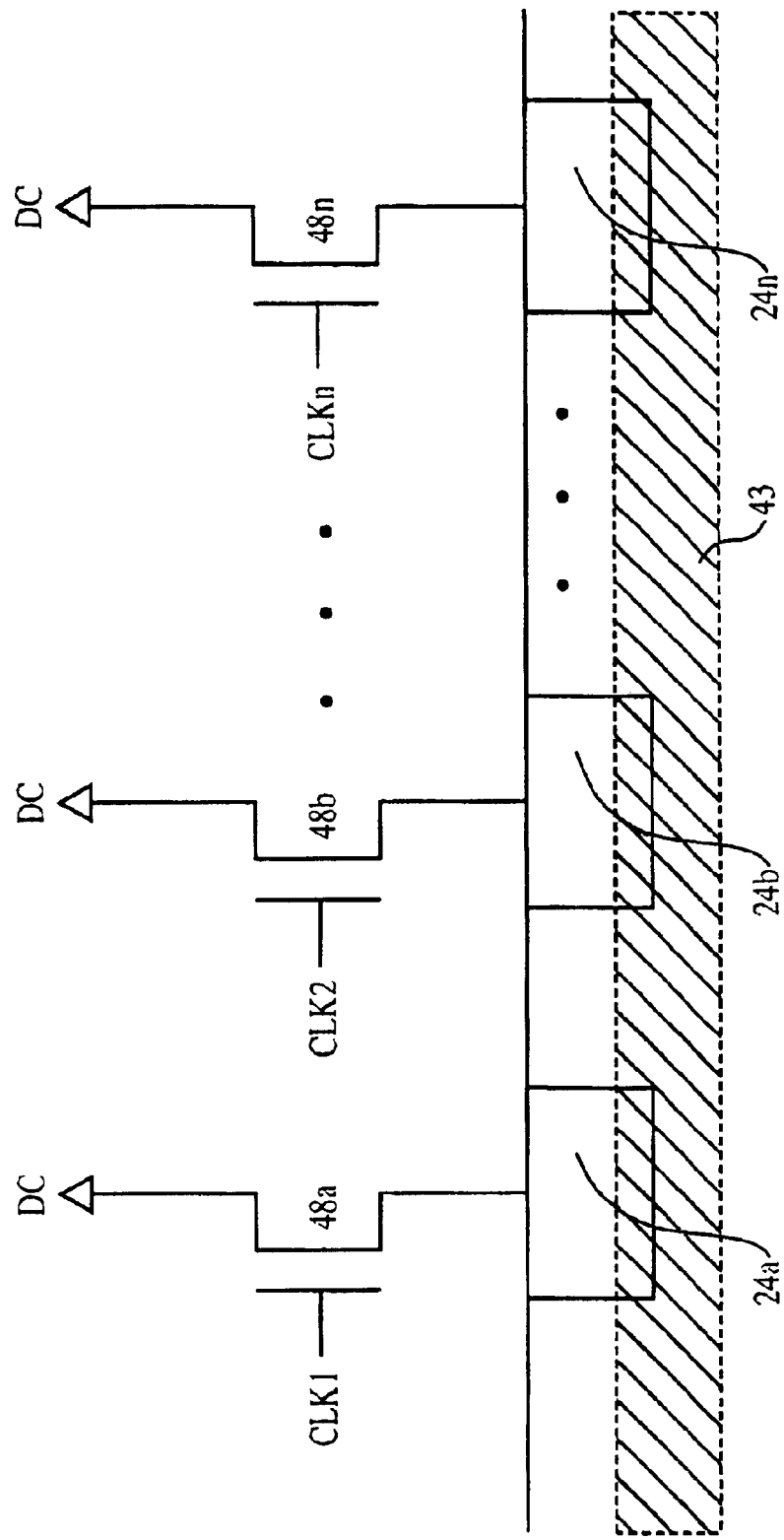
FIG. 4 is a diagram of a set of photodetectors.

In a second configuration waveguide 16a is facing an array of photodetectors 24a–c as seen in FIG. 4 where interior sidewall 46 will have different dimensions than the first configuration to accommodate the array of photodetectors 24a–c. The area of interior sidewall 46 of waveguide 16a will be large enough to cover a zone 43 and the area above the zone 43.

Other configurations include having multiple waveguides applied to the first or second configuration. When the substrate is silicon it is preferred that a short wavelength of laser light of typically 850 nm be chosen for high efficiency but with a penetration depth of approximately 45 microns into the silicon. A lower wavelength 450 nm will minimize the penetration depth into IC chip 14 to a few microns and the efficiency will decrease to about 30%.

Referring to FIG. 4, n photodetectors 24 convert a packet of n laser light pulses to n electronic pulses. Initially, n photodetectors 24, e.g. photodetector 24a, photodetector 24b, and photodetector 24n, are connected to a DC reverse voltage by photodetector controllers of n transistors of MOS, transistor 48a, transistor 48b, and transistor 48n. Photodetectors 24a–n are optically insensitive to light such that a light beam hitting the photodetectors 24a–n will not disturb their DC reverse voltage. The DC reverse voltage causes depleted junction 42 to extend to a depth 42b into the substrate of IC chip 14. Later when photodetectors 24a–n are released from the DC voltage, each of them will be very sensitive to laser light to about 500 photons by laser-pulse.

The incoming light pulses are identified by a separate clock recovery circuit (not shown). The clock recovery circuit recognizes the frequency of the incoming light pulses and provides clock signals CLK1, CLK2, and CLKn for the n transistors 48a–n.

The speed of the laser source defines the maximum number of n photodetectors 24 that receive light from waveguide 16a. For example, if the laser source operates at 100 GHz and n photodetectors 24 operate at a speed of 1 GHz maximum frequency, the laser source can provide packets of 10 pulses maximum. Therefore, an array of ten photodetectors 24 facing waveguide 16a is needed.

Figure 5:
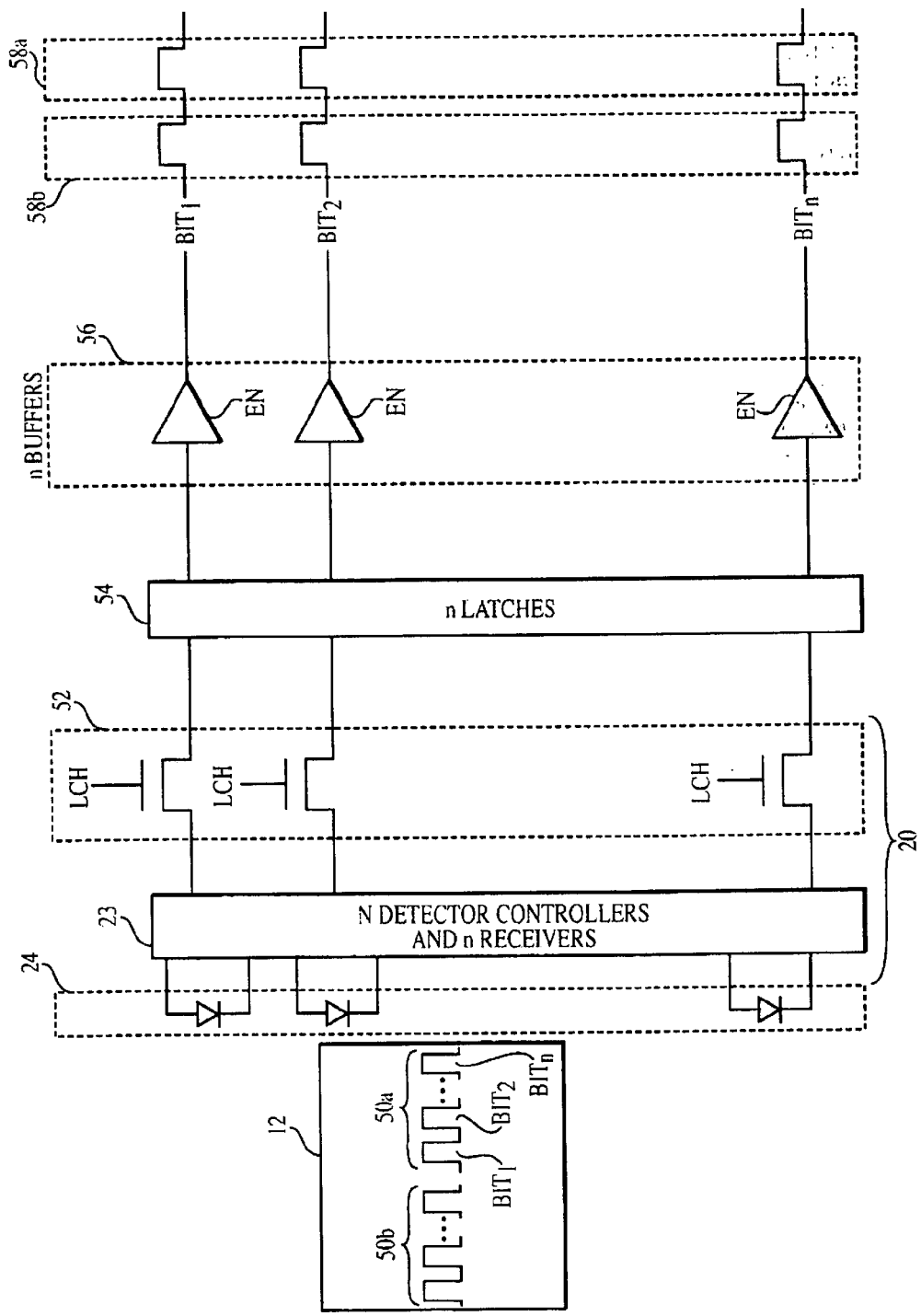
FIG. 5 is a functional diagram of a front-end of the optical delivery system.

Referring to FIGS. 4 and 5, when packets of n laser light pulses, e.g. packet 50a and packet 50b, radiate in parallel n photodetectors 24a–c and the junction depletion level 42, clock pulse CLK1 releases photodetector 24a from DC voltage. By releasing the DC voltage, the voltage at photodetector 24a is no longer fixed but floating, allowing photodetector 24a to detect a first light pulse bit1 of the packet 50a. In the following time periods, clock pulse CLK2 will release photodetector 24b to detect a light pulse bit2 of the packet 50a, and clock pulse CLKn will release photodetector 24n to detect a last light pulse bitn of the packet 50a, according to the timing diagram shown in FIG. 6. Thus, n laser light pulses are electronically converted to n electronic pulses.

In a more complex system utilized for wider bandwidth of data transmission, waveguides 16a–b are used for driving multiple wavelengths of laser light simultaneously. In such a configuration, multiple packets are coming in parallel so that each will be detected by their corresponding arrays of n photodetectors 24. The more complex system contains many channels of data traveling in parallel where each channel is realized within a waveguide and its corresponding single or array of photodetectors as in FIG. 4.

Figure 6:
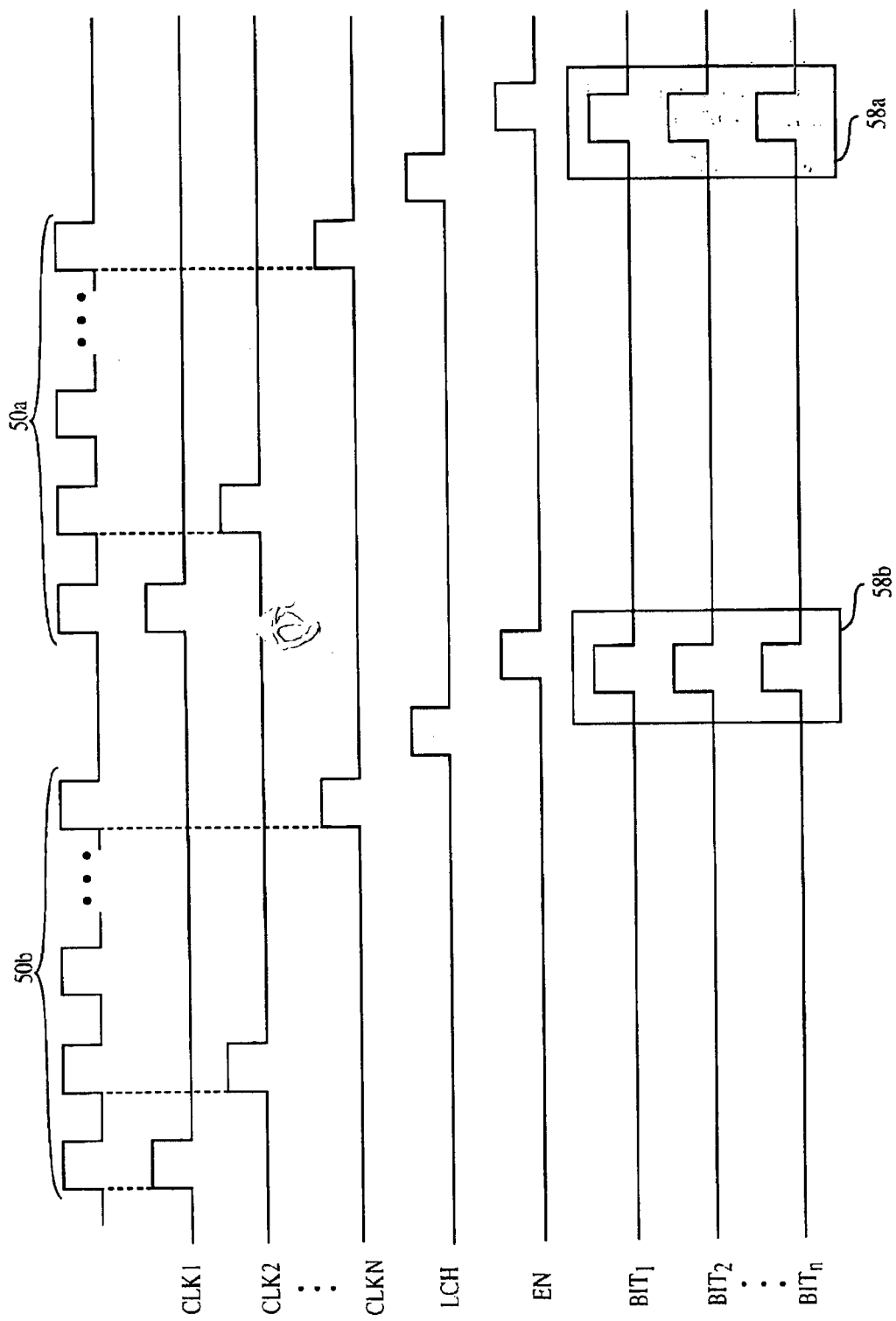
FIG. 6 is a timing diagram of FIG. 5.

Referring to FIGS. 5 and 6, the n laser light pulses are converted by n receivers 23 to a digitized packet. A clock signal LCH will activate transfer transistors 52 to store the digitized packet in n latches 54. A signal EN will enable n buffers 56 to amplify and deliver a digitized packet, e.g. digitized packet 58a and digitized packet 58b to IC 22.

Figure 7:
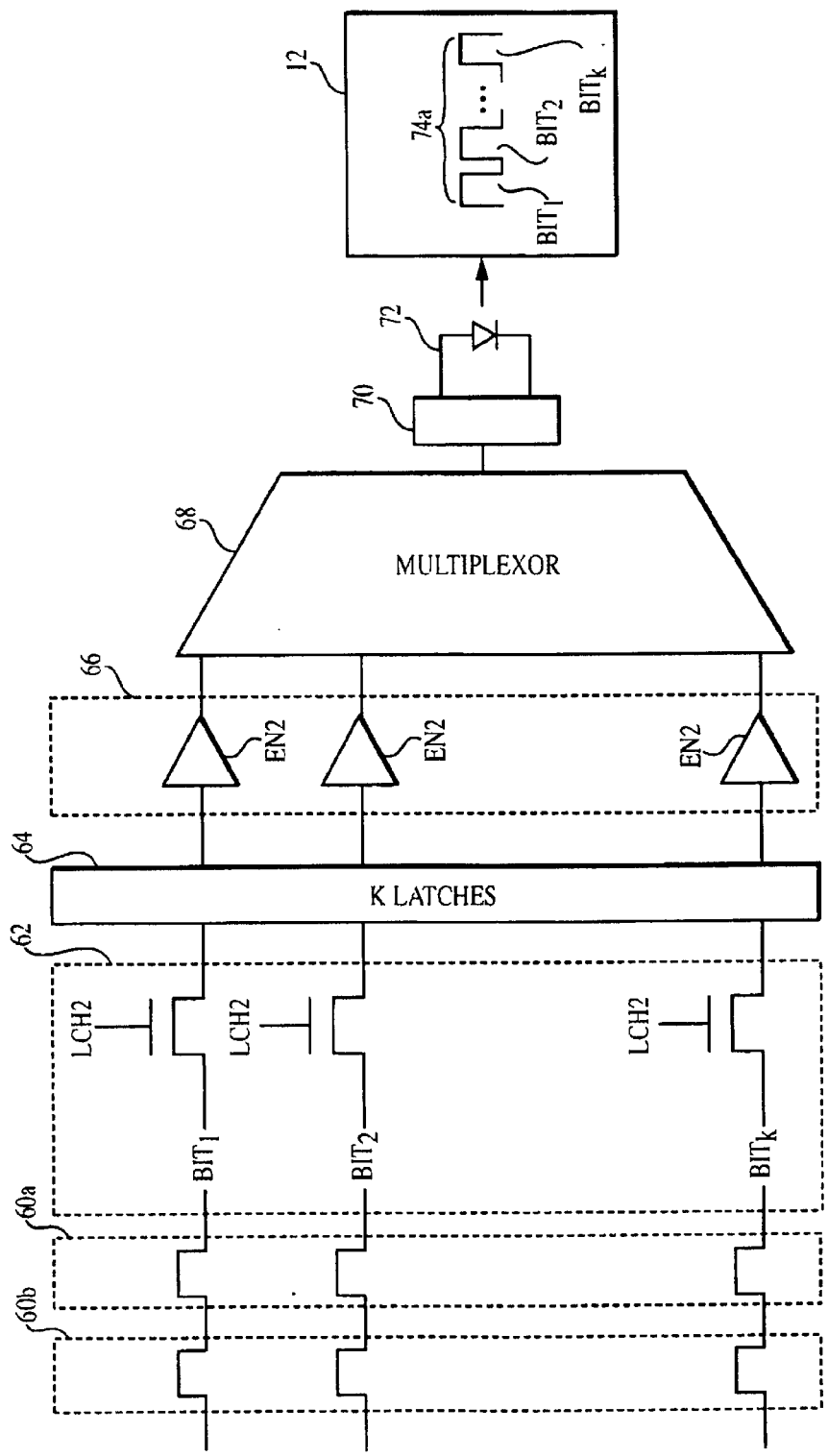
FIG. 7 is a functional diagram of a back-end of the optical delivery system.
Figure 8:
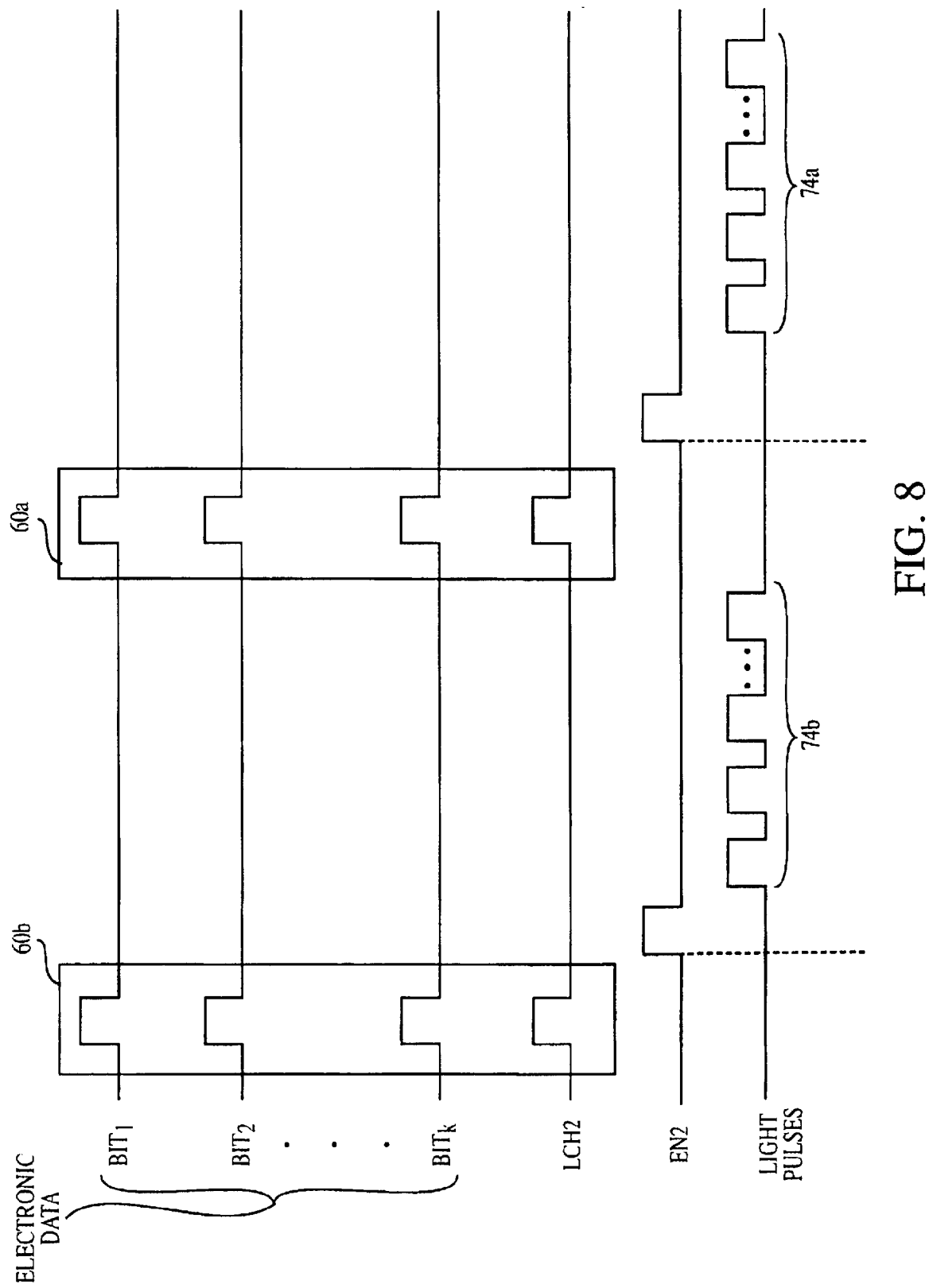
FIG. 8 is a timing diagram of FIG. 7.

Referring now to FIGS. 7 and 8, IC 22 can send data indirectly to optical network 12. IC 22 transmits electronic packets (e.g. electronic packet 60a and electronic packet 60b) where each packet has k pulses, where k≧1. The electronic packets 60a and 60b are stored at a set of k transistors 62 and released by clock signal LCH2 to a set of k latches 64 for storing a digitized packet. A set of k buffers 66 amplifies and delivers a set of the stored k electronic pulses to a multiplexer 68 when enabled by clock signal EN2. Multiplexer 68 is a high speed multiplexer. A laser controller 70 receives a series of k electronic pulses from multiplexer 68. These electronic pulses will power laser light source 72. Laser light source 72 will emit a laser pulse when an electronic pulse is high so that packets 60a–b of k electronic pulses are converted to packets 74a–b of k laser light pulses.

As mentioned above, IC chip 14 is fabricated so that n photodetectors 24 are positioned on the sidewall 40 of IC chip 14. Design rules dictate that during wafer fabrication, an empty space, known as a scribe line, of about 100 microns exists between the bonding pads and the edge of each die. The scribe line ensures that the pad structure is secure during slicing of the wafer and prevents cracking when wiring the bonds to the pads.

Figure 9:
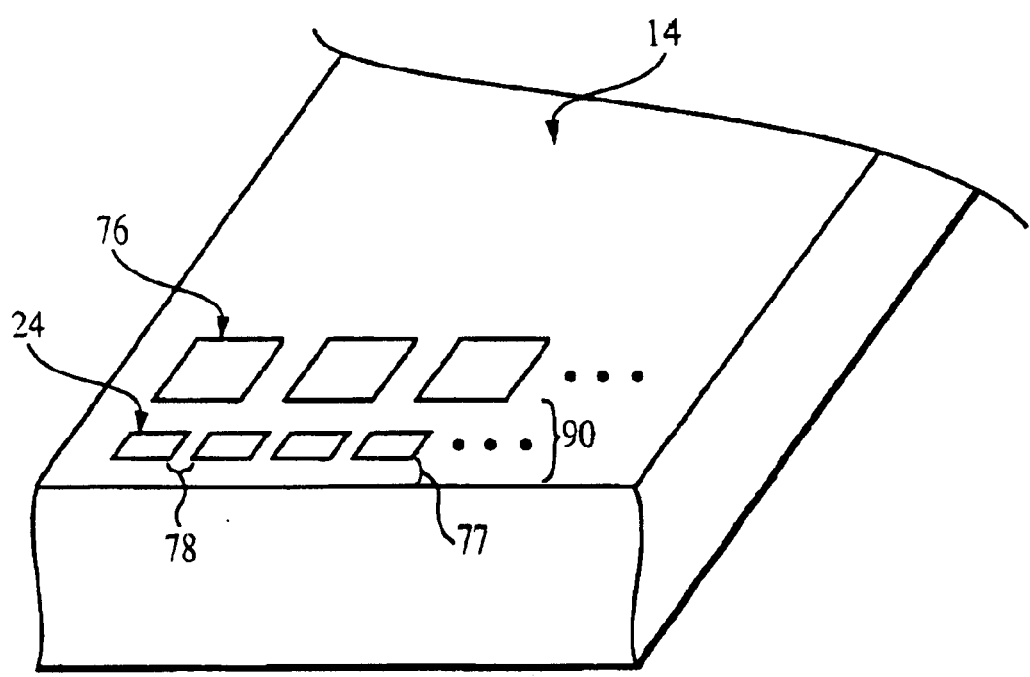
FIG. 9 is a top view of an integrated circuit chip.

Referring to FIG. 9, the scribe line 90 will be used to design the n photodetectors 24, on the periphery of IC chip

14 by placing n photodetectors 24 at an edge of IC chip 14 behind a set of bonding pads 76. A minimum space distance 78 of preferably 25 microns is maintained between two adjacent photodetectors to minimize the photocarrier interactions.

The wafer is mounted, e.g. on a pressure sensitive carrier tape and diced with a high-speed saw with an accuracy of greater than 2 microns. The cut occurs in a straight line at least a few microns distance 77 from n photodetectors 24 in order to protect n photodetectors 24. The cut IC chip 14 is washed, for example, with a detergent solution to remove silicon dust. The lateral sides of IC chip 14 are planarized and made perfectly vertical with a uniform polisher, for example. Solderballs 30 are added to IC chip 14 and mounted inside cavity 28 of module 18. The dimensions of cavity 28 are larger than IC chip 14 by a few tenths of a micron on each side to form free space 38 connection. The width of free space 38 is small enough to minimize laser light loss but large enough to allow IC chip 14 to expand due to thermal changes without cracking IC chip 14 against module 18. As an option, an addition of a faceplate ring (not shown) will limit the spread of light.

Since module 18 is made of many layers, waveguides 16a and 16b can be fabricated at a precise level so that they are positioned to direct horizontal laser light on the depletion zone 42 and the n photodetectors 24. The waveguides can be built from one of many materials such as plastic, polymer, glass, and so forth.

Figure 10:
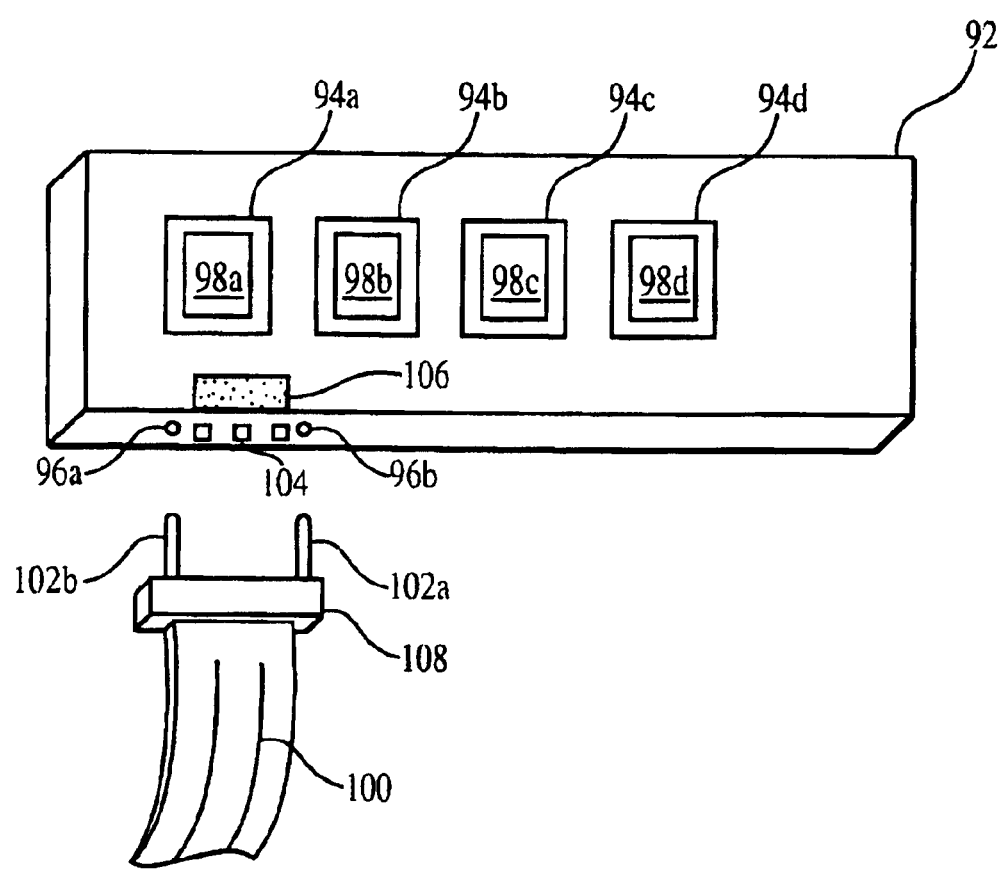
FIG. 10 is a second example of an optical delivery system.

Referring to FIG. 10, other examples of the system 10 include having a module 92 with multiple cavities (e.g. cavity 94a, cavity 94b, cavity 94c and cavity 94d) and guide-holes (e.g. guide-hole 96a and guide-hole 96b). An IC chip 98a rests within cavity 94a (other IC chips 98b–d rest in cavities 94b–d respectively). An optical fiber ribbon 100 with guide-pins (e.g. guide-pin 102a and guide-pin 102b) is inserted into guide-holes 96a–96b so that an optical fiber (not shown) within optical ribbon 100 is aligned with waveguide 104. Optical ribbon 100 is held in place by a ferrule connector 106 and connector plug 108.

Still other examples include having photoreceivers on all sides of IC chip 14 where there are multiple waveguides. Other examples include sending the same amount of electronic pulses per packet from IC chip 14 as IC chip 14 receives light pulses per packet so that k=n.

Other embodiments not described here are also within the scope of the following claims.

What is claimed is:

1. A system comprising:
a multi-sided module having a cavity housing a substrate;
n photoreceivers located on a side of the substrate and adapted to receive a beam of collimated light directed by a waveguide, the beam of collimated light comprising a laser light packet having n laser light pulses;
an integrated circuit (IC) positioned at the substrate to receive output from the n photoreceivers and configured to send k electronic pulses to a multiplexer;
a laser controller configured to receive k electronic pulses from the multiplexer; and
a laser light source configured to receive an input from the laser controller and to send a second laser packet having k light pulses.

2. The system of claim 1, wherein the beam of collimated light comes from a network.

3. The system of claim 1, wherein n photoreceivers are connected to a first set of n transistors and include n photodetectors for converting the n laser light pulses to n electronic pulses and n receivers for converting the n electronic pulses to a first digitized packet.

4. The system of claim 3, further comprising:
n latches for storing the digitized packet; and
n buffers for amplifying and delivering the first digitized packet from the n latches to the IC.

5. The system of claim 4, further comprising:
a second set of n transistors activated by a clock pulse, the second set of n transistors transferring the first digitized packet to the n latches.

6. The system of claim 5, further comprising:
k latches for storing a second digitized packet sent by the IC, where k≧1, the second digitized packet having k electronic pulses; and
k buffers for amplifying and delivering the k electronic pulses to a multiplexer.

7. The system of claim 1, wherein k=n.

8. The system of claim 1, wherein n≧1.

9. The system of claim 1, wherein the laser light is injected horizontally into the substrate.

10. The system of claim 1, wherein the beam of collimated light has at least one wavelength.

11. The system of claim 1, wherein the substrate includes a first surface and a second surface opposite the first surface, the first surface is in contact with the module and the sides of the substrate and the second surface are not in contact with the module.

12. A system comprising:
a multi-sided module having a cavity housing a substrate;
n photoreceivers located at a plurality of sides of the substrate and adapted to receive a laser packet having n laser light pulses;
waveguides located at the module directing the n laser light pulses from the laser source to the n photoreceivers;
an integrated circuit (IC) located at the substrate receiving output from n photoreceivers and configured to send k electronic pulses to a multiplexer;
a laser controller configured to receive the k electronic pulses from the multiplexer; and
a laser light source configured to receive an input from the laser controller and to send a second laser packet having k light pulses.

13. The system of claim 12, wherein the n laser light pulses comes from a network.

14. The system of claim 13, wherein n photoreceivers are connected to a first set of n transistors and include n photodetectors for converting the n laser light pulses to n electronic pulses and n receivers for converting the n electronic pulses to a first digitized packet.

15. The system of claim 14, further comprising:
n latches for storing the digitized packet; and
n buffers for amplifying and delivering the first digitized packet from the n latches to the IC.

16. The system of claim 15, further comprising:
a second set of n transistors activated by a clock pulse, the second set of n transistors transferring the first digitized packet to the n latches.

17. The system of claim 16, further comprising:
k latches for storing a second digitized packet sent by the IC, where k≧1, the second digitized packet having k pulses; and
k buffers for amplifying and delivering the k electronic pulses to a multiplexer.

18. The system of claim 12, wherein k=n.

19. The system of claim 12, wherein $n \geq 1$.

20. The system of claim 12, wherein the laser light is injected horizontally into the substrate.

21. The system of claim 12, wherein the beam of collimated light has at least one wavelength.

22. The system of claim 12, wherein the substrate includes a first surface and a second surface opposite the first surface, the first surface is in contact with the module and the sides of the substrate and the second surface are not in contact with the module.

23. A method comprising:
    directing a beam of collimated light through a waveguide positioned at a multi-sided module towards n photoreceivers located at a side of a substrate contained in a cavity of the module;
    sending an output of the n photoreceiver to an integrated circuit (IC);
    storing a second digitized packet received from the IC using k latches, where $k \geq 1$;
    amplifying the second digitized packet received from the k latches using k buffers;
    delivering the second digitized packet to a multiplexer;
    sending k electronic pulses received from the multiplexer to a laser controller;
    sending an input from the laser controller a laser light source; and
    directing a second laser packet having k laser light pulses to the network.

24. The method of claim 23, wherein the beam of collimated light includes a first laser light packet, the laser light packet having n laser light pulses.

25. The method of claim 23, wherein the beam of collimated light comes from a network.

26. The method of claim 24, wherein the n photoreceivers are connected to a first set of n transistors and includes n photodetectors for converting the n laser light pulses to a first set of electronic pulses and n receivers for converting the first set of electronic pulses to a first digitized packet.

27. The method of claim 26, further comprising:
    sending a clock pulse to a second set of n transistors;
    transferring the first digitized packet to n latches;
    storing the first digitized packet at the n latches;
    amplifying the first digitized packet received from the n latches using n buffers; and
    delivering the first digitized packet from the first set of n buffers to the IC.

28. The method of claim 23, wherein k=n.

29. The method of claim 23, wherein $n \geq 1$.

30. The method of claim 23, wherein the laser light is injected horizontally in to the substrate.

31. The method of claim 23, wherein the beam of collimated light has at least one wavelength.

32. The method of claim 23, wherein the substrate includes a first surface and a second surface opposite the first surface, the first surface is in contact with the module and the sides of the substrate and the second surface are not in contact with the module.

33. A method comprising:
    directing a beam of collimated light through a waveguide positioned at a multi-sided module towards n photoreceivers located at a side of a substrate contained in a cavity of the module;
    sending an output of the n photoreceivers to an integrated circuit;
    storing a second digitized packet received from the integrated circuit using k latches, where $k \geq 1$; and
    directing a second laser packet having k laser light pulses.

34. The method of claim 33, further comprising:
    amplifying the second digitized packet received from the k latches using k buffers;
    delivering the second digitized packet to a multiplexer;
    sending k electronic pulses received from the multiplexer to a laser controller; and
    sending an input from the laser controller to a laser light source.

35. The method of 33, wherein the beam of collimated light includes a first laser light packet, the laser light packet having n laser light pulses.

36. The method of claim 33, wherein the beam of collimated light comes from a network.

37. The method of claim 33, wherein directing a second laser packet comprises directing a second laser packet having k laser light pulses to a network.

38. The method of claim 33, wherein the n photoreceivers are connected to a first set of n transistors and includes n photodetectors for converting the n laser light pulses to a first set of electronic pulses and n receivers for converting the first set of electronic pulses to a first digitized packet.

39. The method of claim 38, further comprising:
    sending a clock pulse to a second set of n transistors;
    transferring the first digitized packet to n latches;
    storing the first digitized packet at the n latches;
    amplifying the first digitized packet received from the n latches using n buffers; and
    delivering the first digitized packet from the first set of n buffers to the IC.

* * * * *